United States Patent [19]

Shidel et al.

[11] 4,041,285
[45] Aug. 9, 1977

[54] BI-DIRECTIONAL MOTION SENSING AND CLOCKING SYSTEM

[75] Inventors: Jerome E. Shidel, Mill Run; Harry R. Sampey, Vanderbilt, both of Pa.

[73] Assignee: Pentron Industries, Inc., Cleveland, Ohio

[21] Appl. No.: 675,750

[22] Filed: Apr. 12, 1976

[51] Int. Cl.² .................. G01S 11/00; G06F 15/20
[52] U.S. Cl. .................. 235/150.27; 235/151.32; 340/24
[58] Field of Search ............ 235/151.3, 151.32, 150.2, 235/150.27; 324/160, 161, 181; 340/23, 24

[56] References Cited

U.S. PATENT DOCUMENTS

| | | | |
|---|---|---|---|
| 3,537,102 | 10/1970 | Baratto | 340/347 |
| 3,725,655 | 4/1973 | Edstrom et al. | 235/151.32 |
| 3,789,198 | 1/1974 | Henson et al. | 235/150.27 |
| 3,825,734 | 7/1974 | Jacobs et al. | 235/151.32 X |
| 3,984,806 | 10/1976 | Tyler | 235/150.27 X |

Primary Examiner—Edward J. Wise
Attorney, Agent, or Firm—Cushman, Darby & Cushman

[57] ABSTRACT

An electrical bi-directional motion sensing and clocking system is disclosed for identifying the relative sense and magnitude of movement experienced by a moving body. The corresponding relative motion of a target past a pair of sensor units produces a pair of input signal pulses from the sensors for each increment of movement experienced by the moving body. Each occurrence of such a pair of input pulses is recorded and gives rise to a clock output signal upon the recorded occurrence of both input signals. The relative occurrence sequence of the two input signals is also recorded and utilized to provide a respectively corresponding output representing the direction of body movement to be associated with the detected movement increment. The system is arranged so as to suppress spurious output signals which might otherwise be generated when the relative sequence of input signals is reversed at any arbitrary point in the cycle of detecting an increment of motion.

20 Claims, 3 Drawing Figures

BI-DIRECTIONAL MOTION SENSING AND CLOCKING SYSTEM

This invention relates generally to electrical circuits and/or systems for sensing the relative occurrence sequence of at least first and second sequential and repetitive electrical input signals and providing electrical output signals representing the sensed relative sequence and also representing the number of such repetitive sequential occurrences. More particularly, this invention relates to an electrical bi-directional sensing and clocking circuit which is particularly adapted, for example, to a bi-directional motion sensing and clocking system utilized for identifying the relative sense and magnitude of movement experienced by a moving body.

It is often desirable and/or necessary in certain environments to provide electrical signals representing both direction and magnitude of some sensed relative motion. For example, such environments may involve the movement of a vehicle such as a gantry crane along predefined axes of motion so as to either monitor the movement and instantaneous position of the vehicle and/or so as to provide feedback information to an automatic movement control unit which is, in turn, attempting to position the vehicle at predetermined coordinates. Such vehicles may, for example, be found in automated warehouse or storage yard environments or the like.

It will also be appreciated that there are many other environments in which both the direction and magnitude of relative motion of something must be monitored. While that something may often comprise a vehicle, such is not necessarily the case. Accordingly, for the purposes of the following description, the relative motion in question will be defined by the movement of a moving body without reference to the particular type of structure constituting such a moving body.

If one merely wants to record the magnitude of distance traversed by a moving body along a single coordinate axis, then one can arrange to generate electrical pulses in a train wherein each pulse represents the traversal of a predetermined increment of distance. The total distance traversed is then measured by directly or indirectly counting the pulses and thus accumulating the total increment of distance traversed.

However, as will be appreciated, such a system operating with a single pulse train input does not ordinarily contemplate changes in the direction of body movement along the motion axis. Where such reversals of direction are anticipated, it is necessary to detect not only increments of traversed motion but also the direction of such motion so that the increments can either be added or subtracted as the case may be from a register having an accumulated contents representative of the body's instantaneous position along the motion axis.

One technique for providing directional information is to arrange for the generation of two similar trains of input pulses wherein each pulse represents the traversal of a predetermined increment of distance but wherein the two pulse trains have different relative phase relationships depending upon the direction of body movement along the motion axis. For example, if the body motion is in a first direction one might expect to receive a pulse on a first input lead followed by a similar corresponding pulse on a second lead whereas if the motion direction is reversed one would expect to first see a pulse on the second lead followed by a similar corresponding pulse on the first lead. Thus, for each increment of traversed distance, there would be a pair of input pulses presented on the first and second leads with the relative occurrence sequence of such pulses indicating the motion direction to be associated with such an increment of movement.

While such a scheme may seem relatively straight forward, actual practical experience has shown that special care and precaution must be taken in such a scheme to insure against possible spurious motion detections, which errors accumulate with the on-going operation of such a system.

For example, unless care is taken to insure that a complete pair of such input pulses has been received before recording an increment of traveled distance, an error may be produced when direction reversal occurs at approximately the same time that one or both of the input pulses are generated. It is also possible for the moving body to slightly oscillate about such a position and thereby cause erroneous information to be accumulated unless special precaution is taken.

Accordingly, the circuit and system of this invention incorporates special features which insure accurate coordinate monitoring and recording regardless of the number of direction changes or regardless of the timing of such changes. As will be described in more detail below, this result is achieved by circuitry which insures against recording an increment of traversed distance unless a complete pair of input pulses has been received. Restated somewhat differently, the circuitry of this invention will selectively ignore spurious input pulses on one input lead where that pulse is not properly paired with a corresponding similar pulse on another input lead.

The circuit and system of this invention also includes features to eliminate spurious operation which might otherwise be caused by contact bounce or other spurious input signals interspersed with the legitimate input pulse trains.

These and other objects and advantages of this invention will be more fully understood by reference to the following detailed description of an exemplary presently preferred embodiment of the invention taken in conjunction with the accompanying drawings, of which:

Figure 1:
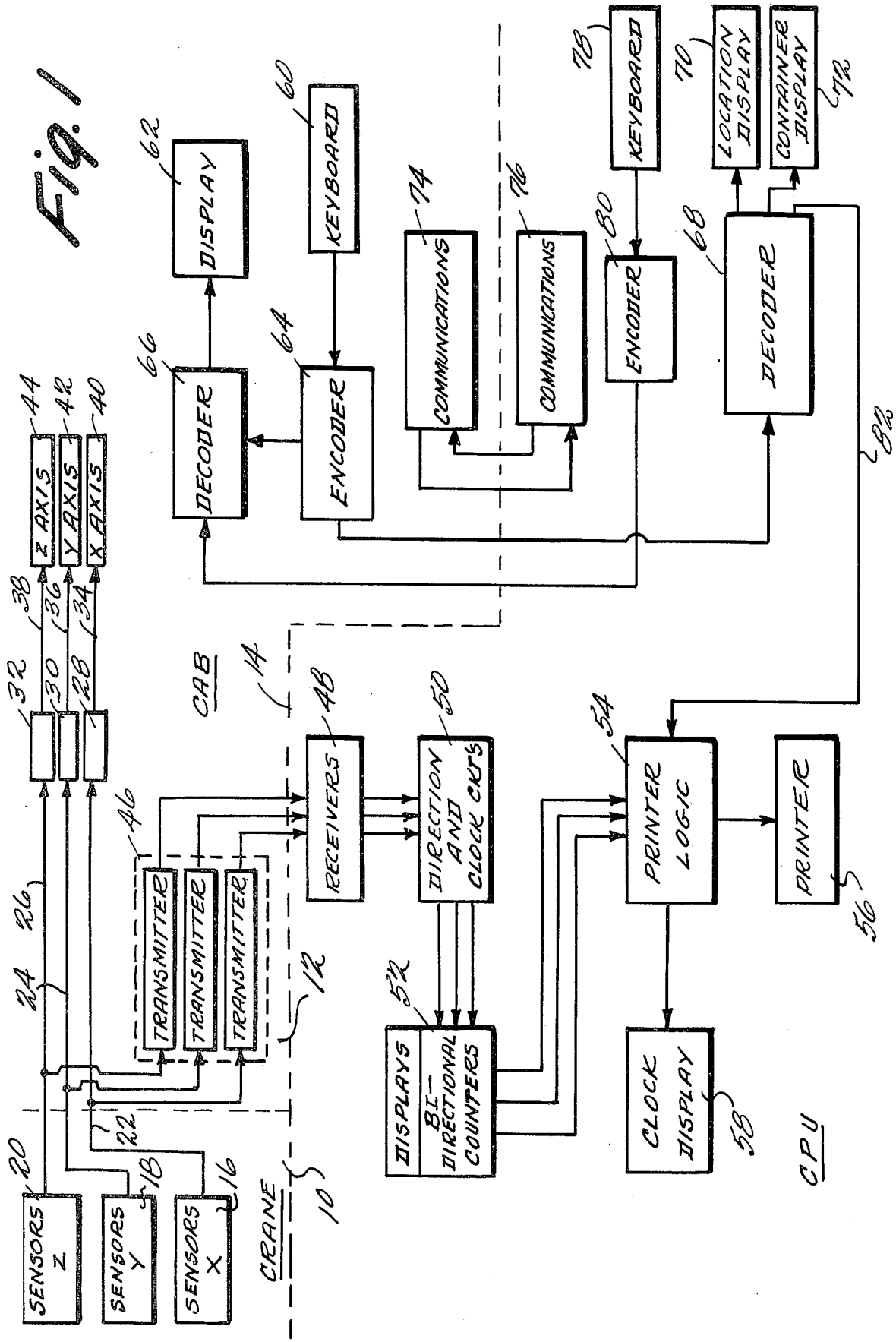
FIG. 1 is a block diagram of an overall coordinate monitoring and recording system for identifying the position of a vehicle traveling along defined axes.

The coordinate monitoring and recording system shown in FIG. 1 is divided into three portions by dotted lines shown in FIG. 1. There is a moving vehicle (body) 10 which is adapted for motion along any of three orthogonal x, y, z motion axes. There is an operator cab portion 12 associated with the crane 10 and electrically connected to a central processing unit 14. In this exemplary embodiment, the coordinate information is transmitted to and read either in the moving vehicle or at the remote CPU location, or both.

In this exemplary embodiment, there is a rotating wheel (not shown in FIG. 1) associated with each of the x, y, and z motion axes. Motion along any of these predefined axes will cause corresponding motion of the respectively corresponding wheel. Targets (magnetic in the preferred embodiment) are mounted on the rotating wheel and a pair of sensors are mounted in proximity to the path of the moving target for producing the first and second trains of input pulses corresponding to predetermined increments of motion along the respectively corresponding motion axis. In the preferred embodiment, the number of targets utilized is such as to cause the generation of one pulse for approximately one foot of traversed motion. As shown in FIG. 1, there are a pair of x axis sensors 16, a pair of y axis sensors 18 and a pair of z axis sensors 20. The sensors in any given pair are located relative to one another such that a pulse is produced from a first sensor followed by a corresponding similar pulse from the second sensor when relative motion is in a first direction and where the output pulse sequence from the pair of sensors is reversed in relative sequence for motion in the opposite direction.

Thus, the output 22 from the x sensor 16 is actually two lines providing two trains of electrical pulses although only a single line is shown in FIG. 1 to simplify the drawing. Similarly, the output 24, 26 from the y and z sensors 18, 20 each respectively comprise a pair of signal transmission paths. The three pairs of input pulse trains 22, 24, 26 are individually input to direction and clocking circuits 28, 30 and 32 respectively. The direction and clocking circuits 28, 30 and 32 are shown in detail at FIG. 2 and will be explained more fully below. For the moment, it is sufficient to note that such circuitry sees three pairs of input pulse trains 22, 24 and 26 respectively and produces a pair of outputs at 34, 36 and 38 respectively to corresponding x, y and z axis bi-directional counters and displays 40, 42 and 44 respectively. Thus, taking the x axis as an example, a movement in a first direction by a predetermined increment will cause a pair of pulses to appear on dual transmission paths at 22 wherein such a pair of pulses has a predetermined relative phase sequence. The direction and clocking circuit 28 will process this pair of pulses to produce a direction signal and a clock signal on line 34 input to the x axis bi-directional counter 40 which will then increment its accumulated contents by adding or subtracting another increment of traverse distance thereto depending upon which direction signal is presented at 34. As should now be appreciated, similar operation will be experienced in each of the other motion axes.

The three pairs of pulse trains on lines 22, 24 and 26 are also transmitted to the CPU 14 via transmitters 46 and receivers 48. Although frequency shift tone transmitters and receivers of conventional design are used in the preferred exemplary embodiment, it will be understood that any conventional form of data transmitting and receiving apparatus including simple hard-wired conductors may be suitable under given environmental conditions.

At the CPU site, the three pairs of pulse trains are input to direction and clock circuits 50 similar to the direction and clock circuits 28, 30 and 32 discussed above and which will be described individually in more detail below. The direction and incrementing/decrementing outputs from the direction and clocking circuits 50 is then input to x, y and z axis bi-directional counters and displays 52 for display at the central CPU. The accumulated contents of the bi-directional counters 52 may also be input to conventional logic circuits 54 for driving a conventional printer 56.

It will also be noted in FIG. 1 that conventional keyboard 60 is provided in the cab 12 for keying in data which may be displayed at 62 in the cab 12 via an encoder 64 and decoder 66 as will be appreciated by those in the art. In addition, the output of the encoder 64 is also transmitted to a decoder 68 located at the central processing unit 14 which in turn drive displays 70, 72. Typically, the system of the exemplary embodiment may utilize such a keyboard 60 so that the cab operator may key in the location and identification of a particular container which he has actually retrieved or which he is intending to retrieve. Conventional voice communication devices 74, 76 permit voice communication between the cab operator and an operator at the CPU 14. In addition, the CPU operator is also provided with a conventional keyboard 78 and an encoder 80 for transmitting data to the decoder 66 located at the cab location 12. This data generated by the operator at the CPU can also be displayed for the cab operator at display 62. In addition, the output of the decoder 68 may also be connected such as at 82 to provide an output at the printer 56, etc. as will be appreciated.

Accordingly, the system of FIG. 1 generates pairs of pulse trains which are coded and transmitted to receivers in the cab 12 and at the remote CPU 14. The receivers decode the information and send it on to the direction and clock circuits which determine the direction of travel for any given motion axis and which also determine when an increment of motion along such axis should be counted. Such processed data then goes to bi-directional counters and displays which give real time readouts of crane position as should now be appreciated.

Desired location of material and/or containers to be found or transported by the crane can be displayed and/or generated at either the cab 12 or CPU 14 locations. Such data can also be recorded on a printer or transmitted to a computer or other data storage unit as will be appreciated. It will also be appreciated that this system could readily be automated so as to proceed from one location to another, carrying and depositing material without any on-site operator in the cab 12.

As mentioned previously, for a system as described in FIG. 1 to operate properly, the direction and clock circuits 28, 30 and 32 and/or 50 must carefully distinguish possible spurious input signals and produce incrementing/decrementing outputs at 34, 36 and 38 which are correct indications of actual crane movements in spite of possible spurious input pulses at 22, 24 and 26 respectively.

Figure 2:
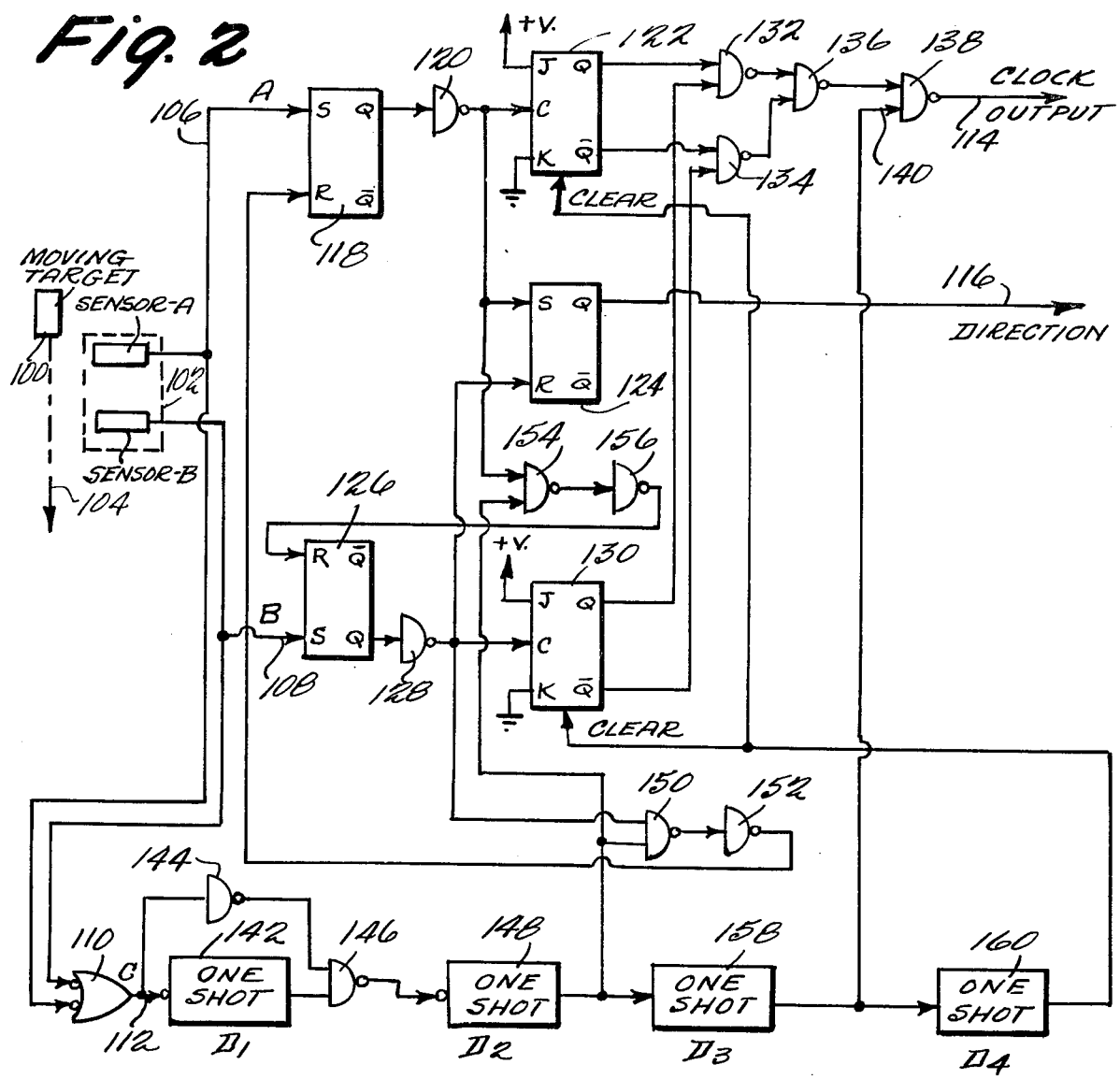
FIG. 2 is a circuit diagram for an exemplary embodiment of the electrical bi-directional sensing and clocking circuit utilized in the motion sensing system of FIG. 1.
Figure 3:
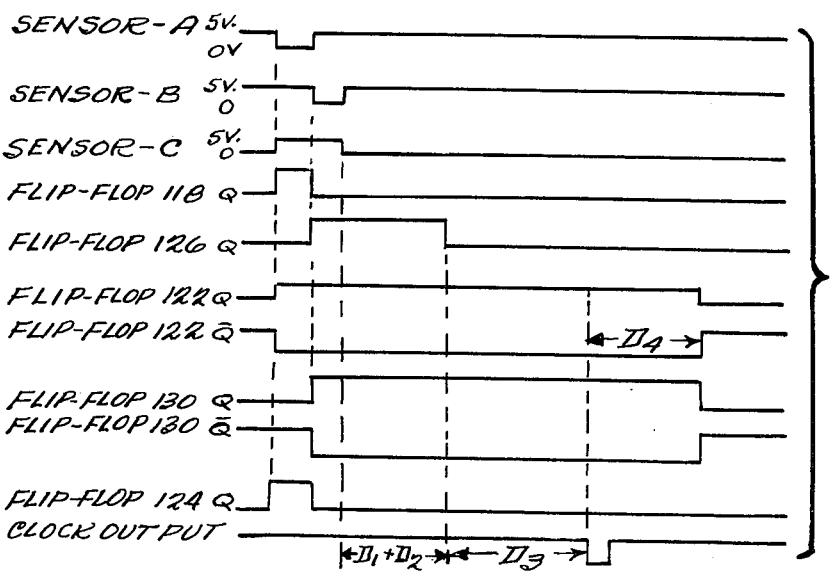
FIG. 3 is a graphic depiction of several electrical waveforms present during the operation of the circuitry shown in FIG. 2.

Since the x, y and z direction and clocking circuits 28, 30 and 32 are identical, only the x axis circuit is shown and explained in detail in FIGS. 2 and 3. As shown, one or more moving targets 100 are mounted for relative motion with respect to a pair of sensors A and B mounted at 102. It is, of course, immaterial whether the target is moved or whether the sensors A and B are moved. In any event, as relative motion proceeds in the direction of arrow 104, a first output signal will be generated on line 106 followed by a second output signal shortly thereafter on line 108. These signals on lines 106, 108 are connected to NOR gate 110 so as to provide yet a third sequential signal on line 112 in the absence of any signal on lines 106, 108. In the actual exemplary embodiment, the signal on line 112 is actually provided by relay contacts as are the signals on lines 106, 108 in response to reed switch sensor actuations by a magnetic target.

Accordingly, when the target(s) move past the sensors in the direction of arrow 104, the sequence of signals on lines A, B and C is A, B, C. For the circuit to detect that a complete increment of distance has been traversed, it must first recognize the full sequence A, B, C. Similarly, if the target 100 is moving in the reverse direction from that shown in FIG. 2, then the circuit inputs on lines 106, 108 and 112 would be B, A. C. This system requires the full sequence of pulses to occur in either direction before providing a clock output at 114. At the time such a clock output is provided, circuitry is also provided for recording whether the A signal has occurred before the B input signal or after it and provides an appropriate direction output signal on line 116. Accordingly, the circuit detects both motion and direction accurately regardless of direction changes which may occur at any arbitrary time in the measurement cycle. That is, rocking the target 100 back and forth past one or more of the sensors A, B (jitter) will not cause an erroneous clock output at 114.

Referring to FIG. 3, it will be seen that the output from the sensor A and B is normally at 5 volts in the exemplary embodiment but falls to approximately ground or 0 volts when the moving target 100 passes thereby. The voltage on line 112 is normally at ground potential but rises to approximately 5 volts in the exemplary embodiment whenever the moving target is passing by either sensor A or B. For the purposes of the following discussion, it will be assumed that the moving target 100 is passing by sensors A and B in the direction of arrow 104 as shown in FIG. 2. Under these assumptions, one would see waveforms as shown in FIG. 3 and as will be discussed in detail below.

Initially, a negative going pulse would be presented to the set input of RS flip-flop 118 causing its Q output to transition towards a high voltage level. This positive going transition would be inverted by NAND gate 120 so as to cause a negative going transition at the clock input of JK type flip-flop 122 thus causing its Q output to undertake a positive going transition. It will also be noted that RS type flip-flop 124 will be set by the output of NAND gate 120; however, the resulting high-level output on line 116 is not yet significant since no clock output pulses have been generated on line 114.

Next, the target 100 will move past sensor B causing a negative going pulse on line 108 input to the set input of RS type flip-flop 126. Such will cause a positive going transition at the output Q of RS flip-flop 126, which positive going transition is inverted by NAND gate 128 to a negative going transition input to the clock terminal of JK flip-flop 130. This input will cause JK flip-flop 130 to become set in a manner similar to the previous setting of JK flip-flop 122. Now that both sensors A and B have been activated by the target 100, the NAND gates 132, 134 and 136 are conditioned so as to provide one high logic level input to NAND gate 138. However, NAND gate 138 is still not permitted to transition due to a continuing low level input on line 140.

It will also be noted that RS type flip-flop 124 has now been reset so as to provide a low logic level signal on line 116 representative of the direction 104 in readiness for the generation of a clock output signal on line 114. RS flip-flop 118 has also been reset via NAND gates 150 and 152.

After the target 100 has passed by both sensors A and B, the output from NOR gate 110 on line 112 will experience a negative going transition constituting an input signal to a one shot or monostable multivibrator 142. As will be appreciated, such a one shot multivibrator effectively constitutes a time delay of a predetermined period. In the exemplary embodiment, the time delay $D_1$ associated with one shot 142 is approximately 3 milliseconds. The negative going transition at the input of one shot 142 is inverted by NAND gate 144 and presented as a high logic level input to NAND gate 146. However, the NAND gate 146 is not permitted to transition until after time delay $D_1$ at which time the output from one shot 142 also transitions in a positive direction so as to cause a negative going transition at the output of NAND gate 146 to stimulate another one shot 148 having a time delay $D_2$ of approximately 1½ millisecond in the preferred exemplary embodiment. The output of one shot 148 is transmitted through NAND gates 150, 152 to reset RS type flip-flop 118 if not already reset. Similarly, the output from one shot 148 is also presented via NAND gates 154, 156 to reset RS type flip-flop 126. In this manner, RS type flip-flops 118 and 126 are replaced to their starting states in readiness for processing another cycle of inputs from sensors A and B.

The output from one shot 148 is also presented to another one shot 158 having a time delay $D_3$ (in the presently preferred exemplary embodiment, approximately 1 millisecond) with its output on line 140 providing the other necessary input to NAND gate 138 to produce a negative going clock output pulse on line 114 as should now be appreciated.

Finally, yet another one shot 160 having a time delay $D_4$ (approximately 1 millisecond in the presently preferred exemplary embodiment) receives an input from one shot 158, generates a pulse of $D_4$ time at the conclusion of the pulse of one shot 158, and provides clearing inputs to JK type flip-flops 122, 130 all as shown in FIG. 2.

It will be noted that the arrangement of one shot 142 and NAND gates 144 and 146 requires at least time delay $D_1$ after the disappearance of outputs from either sensor A or B before one shot 148 is stimulated. Thus, if there is a temporary no-signal condition while the moving target 100 is passing between sensors A and B, one shot 148 will not be prematurely or spuriously stimulated.

As should now be appreciated, when sensor A provides an output pulse, it sets RS flip-flop 118 which retains this information until either sensor B is activated (thus setting flip-flop 126 and also resetting flip-flop 118 via NAND gates 128, 150 and 152) or until the target 100 is moved past both sensors A and B (whereupon one shots 142 and 148 will be stimulated to reset flip-flop 118 via NAND gates 150, 152). The RS flip-flop 118 also sets RS flip-flop 124 and a JK type flip-flop 122.

The B input on line 108 then sets RS flip-flop 126 (which, in turn resets the RS flip-flop as previously noted). The RS flip-flop 126 also resets the RS flip-flop 124 so as to provide the proper directional output on line 116 and sets another JK flip-flop 130. The following input on line 112 results in stimulating one shot 148 (which resets the RS flip-flop 118 and 126) and pulses a succeeding one shot 158 which eventually causes the generation of the clock output on line 114 if both JK flip-flops 122 and 130 are in the same state. Finally, the output from one shot 158 stimulates a final one shot 160 which results in resetting or clearing the JK flip-flops 122, 130.

The direction of motion is determined, effectively, by noting which sensor, A or B, was the last sensor to produce a signal just before the one shot 148 was stimulated. The circuit identifies that sensor by looking at the output of the RS flip-flop 124 and noting if it is a high or low state.

The RS flip-flops 118 and 126 also eliminate spurious input pulses due to contact bounce or other interference forces.

The JK flip-flops 122, 130 insure that the pulses occurring on input lines 106, 108 occur the same number of times. That is, the JK flip-flops insure that if a signal is present on line 106 followed by a signal on line 108 and then a change of direction immediately occurs to cause another signal on line 106, a clock pulse is not generated. Thus, this circuit permits the relative direction of the moving target to change instantaneously at any point in the measurement cycle without producing spurious clock outputs on line 114.

Although only a single presently preferred exemplary embodiment of this invention has been described in detail above, those skilled in the art will recognize that this exemplary embodiment may be modified without materially departing from the spirit of the invention. Accordingly, it is noted that the embodiment discussed above is given only for purposes of explanation and that all obvious modifications within the basic spirit of the disclosure intended to be included within this invention insofar as such modifications are within the scope of the following appended claims.

What is claimed is:

1. An electrical bi-directional motion sensing and clocking system for identifying the relative sense and magnitude of movement experienced by a moving body, said system comprising:
   a sensor mounting means,
   target means mounted for relative motion with respect to said sensor mounting means in a direction and in a magnitude corresponding to the relative direction and magnitude of movements experienced by said moving body,
   a first sensor mounted on said sensor mounting means in proximity to the path of said target means and producing a first input signal in response to the passage of said target means thereby,
   a second sensor also mounted on said sensor mounting means in proximity to the path of said target means and producing a second input signal in response to the passage of said target means thereby,
   said first and second sensors being located relative to one another such that said first and second input signals each occur once in a first sequence for a predetermined increment of movement in a first direction by said moving body and once in a second reverse sequence for a predetermined increment of movement by the body in a second direction opposite to said first direction,
   first recording means connected to said first sensor for recording the occurrence of said first input signal,
   second recording means connected to said second sensor for recording the occurrence of said second input signal,
   output gate means connected to said first and second recording means for producing a clock output signal upon the recorded occurrence of both said first and second input signals,
   clearing means connected to said first and second recording means and to said output gate means for clearing the recorded contents of the first and second recording means upon the production of said clock output signal thereby preparing for similar processing of the next succeeding pair of first and second input signals, and
   sequence recording means connected to detect whether the first input signal or the second input signal last occurred just prior to the production of said clock output signal and to provide a respectively corresponding sequence output signal representing the input signal sequence and hence direction of body movement to be associated with the increment of body movement represented by said clock output signal.

2. An electrical bi-directional motion sensing and clocking system as in claim 1 wherein said sequence recording means is connected to said first recording means and to said second recording means.

3. An electrical bi-directional motion sensing and clocking system as in claim 2 wherein said sequence recording means comprises an RS flip-flop having set and reset inputs and Q and $\overline{Q}$ outputs wherein (a) one of the set and reset inputs is connected to said first recording means, (b) the other of the set and reset inputs is connected to said second recording means, and (c) said sequence output signal is provided by one of said Q and $\overline{Q}$ outputs.

4. An electrical bi-directional motion sensing and clocking system as in claim 1 wherein said first recording means comprises:
   a first bistable means connected to transition to a first output state upon the occurrence of said first input signal, and
   a second bistable means connected to respond to the first output state of said first bistable means by transitioning to a first output state which is maintained and presented to said output gate means thereby recording the past occurrence of said first input signal.

5. An electrical bi-directional motion sensing and clocking system as in claim 4 wherein said first bistable means comprises an RS type flip-flop and said second bistable means comprises a JK type flip-flop.

6. An electrical bi-directional motion sensing and clocking system as in claim 4 wherein said second recording means comprises:
   a third bistable means connected to transition to a first output state upon the occurrence of said second input signal, and
   a fourth bistable means connected to respond to the first output state of said third bistable means by transitioning to a first output state which is maintained and presented to said output gate means thereby recording the past occurrence of said second input signal.

7. An electrical bi-directional motion sensing and clocking system as in claim 6 wherein said third bistable means comprises an RS type flip-flop and said fourth bistable means comprises a JK type flip-flop.

8. An electrical bi-directional motion sensing and clocking system as in claim 7 wherein said clearing means comprises:
   input means for providing a third electrical input signal occurring subsequent to the occurrence of a pair of said first and second input signals, and
   further means connected to receive said third input signal and providing, in response thereto (a) a stimulus signal to said output gate means for causing the occurrence of said clock output signal, (b) first resetting signals to said first and third bistable means, and (c) subsequent to the occurrence of said clock output signal, second resetting signal to said second and fourth bistable means.

9. An electrical bi-directional motion sensing and clocking system as in claim 8 wherein said input means comprises:
   a monostable circuit means connected so as to be stimulated to an unstable output state by the sensed absence of said first and second input signals and to remain in said unstable output state for a predetermined time period, and
   logic gating means connected to receive the output from said monostable circuit means and also connected so as to be stimulated by the sensed absence of said first and second input signals,
   said logic gating means providing said third electrical input signal only upon the sustained absence of said first and second input signals for at least said predetermined time period thereby preventing spurious third input signals from being produced during the normal transition occurring between first and second input signals within a pair of such signals during which there may be a brief sensed absence of both the first and second input signals.

10. An electrical bi-directional motion sensing and clocking system as in claim 9 wherein said further means comprises:
   a first time delay means connected to receive said third input signal and to provide said first resetting signals in response thereto after an associated predetermined time delay,
   a second time delay means connected to receive an output from said first time delay means and to provide said stimulus signal in response thereto after an associated predetermined time delay, and
   a third time delay means connected to receive an output from said second time delay means and to provide said second resetting signals in response thereto after an associated predetermined time delay.

11. An electrical bi-directional sensing and clocking circuit for sensing the relative occurrence sequence of at least first and second sequential and repetitive electrical input signals and for providing electrical output signals representing the sensed relative sequence and also representing the number of repetitive occurrences of pairs of said first and second input signals in the detected relative sequence without possibly producing spurious output signals when the relative sequence of the input signals is reversed, said electrical circuit comprising:
   first recording means for recording the occurrence of said first input signal,
   second recording means for recording the occurrence of said second input signal,
   output gate means connected to said first and second recording means for producing a clock output signal upon the recorded occurrence of both said first and said second input signals,
   clearing means connected to said first and second recording means and to said output gate means clearing the recorded contents of the first and second recording means upon the production of said clock output signal thereby readying the circuit to process the next succeeding pair of first and second input signals, and
   sequence recording means connected to detect whether the first input signal or the second input signal last occurred just prior to the production of said clock output signal and to provide a respectively corresponding sequence output signal representing the input signal sequence to be associated with said clock output signal, 12. An electrical bi-directional sensing and clocking circuit as in claim 11 wherein said sequence recording means is connected to said first recording means and to said second recording means.

13. An electrical bi-directional motion sensing and clocking circuit as in claim 12 wherein said sequence recording means comprises an RS flip-flop having set and reset inputs and Q and $\overline{Q}$ outputs wherein (a) one of the set and reset inputs is connected to said first recording means, (b) the other of the set and reset inputs is connected to said second recording means, and (c) said sequence output signal is provided by one of said Q and $\overline{Q}$ outputs.

14. An electrical bi-directional motion sensing and clocking circuit as in claim 11 wherein said first recording means comprises:
   a first bistable means connected to transition to a first output state upon the occurrence of said first input signal, and
   a second bistable means connected to respond to the first output state of said first bistable means by transitioning to a first output stage which is maintained and presented to said output gate means thereby recording the past occurrence of said first input signal.

15. An electrical bi-directional motion sensing and clocking circuit as in claim 14 wherein said first bistable means comprises an RS type flip-flop and said second bistable means comprises a JK type flip-flop.

16. An electrical bi-directional sensing and clocking circuit as in claim 14 wherein said second recording means comprises:
   a third bistable means connected to transition to a first output state upon the occurrence of said second input signal, and
   a fourth bistable means connected to respond to the first output state of said third bistable means by transitioning to a first output state which is maintained and presented to said output gate means thereby recording the past occurrence of said second input signal.

17. An electrical bi-directional motion sensing and clocking circuit as in claim 16 wherein said third bistable means comprises an RS type flip-flop and said fourth bistable means comprises a JK type flip-flop.

18. An electrical bi-directional motion sensing and clocking circuit as in claim 17 wherein said clearing means comprises:
   input means for providing a third electrical input signal occurring subsequent to the occurrence of a pair of said first and second input signals, and
   further means connected to receive said third input signal and providing, in response thereto (a) a stimulus signal to said output gate means for causing the occurrence of said clock output signal, (b) first resetting signals to said first and third bistable means, and (c) subsequent to the occurrence of said clock output signal, second resetting signal to said second and fourth bistable means.

19. An electrical bi-directional sensing and clocking circuit as in claim 18 wherein said input means comprises:

a monostable circuit means connected so as to be stimulated to an unstable output state by the sensed absence of said first and second input signals and to remain in said unstable output state for a predetermined time period, and logic gating means connected to receive the output from said monostable circuit means and also connected so as to be stimulated by the sensed absence of said first and second input signals, said logic gating means providing said third electrical input signal only upon the sustained absence of said first and second input signals for at least said predetermined time period thereby preventing spurious third input signals from being produced during the normal transition occurring between first and second input signals within a pair of such signals during which there may be a brief sensed absence of both the first and second input signals.

20. An electrical bi-directional motion sensing and clocking circuit as in claim 19 wherein said further means comprises:

a first time delay means connected to receive said third input signal and to provide said first resetting signals in response thereto after an associated predetermined time delay, a second time delay means connected to receive an output from said first time delay means and to provide said stimulus signal in response thereto after an associated predetermined time delay, and a third time delay means connected to receive an output from said second time delay means and to provide said second resetting signals in response thereto after an associated predetermined time delay.

* * * * *